United States Patent
Chang et al.

(10) Patent No.: US 9,331,577 B2
(45) Date of Patent: *May 3, 2016

(54) SLAB INDUCTOR DEVICE PROVIDING EFFICIENT ON-CHIP SUPPLY VOLTAGE CONVERSION AND REGULATION

(71) Applicant: International Business Machines Corporation, Armonk, NY (US)

(72) Inventors: Leland Chang, New York, NY (US); David Goren, Nesher, IL (US); Naigang Wang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,586

(22) Filed: Jun. 29, 2015

(65) Prior Publication Data

US 2015/0303810 A1    Oct. 22, 2015

Related U.S. Application Data

(63) Continuation of application No. 13/595,016, filed on Aug. 27, 2012, now Pat. No. 9,118,242, which is a continuation of application No. 13/589,280, filed on Aug. 20, 2012, now Pat. No. 9,124,173.

(51) Int. Cl.
| | |
|---|---|
| *G06F 1/26* | (2006.01) |
| *H02M 3/158* | (2006.01) |
| *H02M 3/156* | (2006.01) |
| *H02M 3/155* | (2006.01) |

(52) U.S. Cl.
CPC .................. *H02M 3/158* (2013.01); *G06F 1/26* (2013.01); *H02M 3/155* (2013.01); *H02M 3/156* (2013.01)

(58) Field of Classification Search
CPC . H02M 3/155; H02M 3/1552; H02M 3/1555; H02M 3/1557; H02M 3/156; H02M 3/158
See application file for complete search history.

(56) References Cited

U.S. PATENT DOCUMENTS

| | | | |
|---|---|---|---|
| 7,327,010 B2 | 2/2008 | Gardner | |
| 7,852,185 B2 | 12/2010 | Gardner et al. | |
| 9,118,242 B2* | 8/2015 | Chang et al. | H02M 3/155 713/300 |
| 9,124,173 B2* | 9/2015 | Chang et al. | H02M 3/155 713/300 |
| 2004/0124931 A1 | 7/2004 | Hajimiri et al. | |
| 2005/0110471 A1 | 5/2005 | Mayega et al. | |
| 2005/0212496 A1 | 9/2005 | Sutardja | |
| 2007/0262402 A1 | 11/2007 | Park | |
| 2008/0003760 A1 | 1/2008 | Gardner et al. | |
| 2010/0117737 A1 | 5/2010 | Kondo et al. | |
| 2013/0099864 A1 | 4/2013 | Kawai et al. | |

* cited by examiner

*Primary Examiner* — Dennis M Butler

(74) *Attorney, Agent, or Firm* — Harrington & Smith; Louis J. Percello

(57) ABSTRACT

A method is disclosed to operate a voltage conversion circuit such as a buck regulator circuit that has a plurality of switches coupled to a voltage source; a slab inductor having a length, a width and a thickness, where the slab inductor is coupled between the plurality of switches and a load and carries a load current during operation of the plurality of switches; and a means to reduce or cancel the detrimental effect of other wires on same chip, such as a power grid, potentially conducting return current and thereby degrading the functionality of this slab inductor. In one embodiment the wires can be moved further away from the slab inductor and in another embodiment magnetic materials can be used to shield the slab inductor from at least one such interfering conductor.

16 Claims, 6 Drawing Sheets

| D Duty Cycle | Output Voltage [Volt] | Efficiency | Output Power [Watt] | Ripple [mV] |
|---|---|---|---|---|
| 0.5815 | 0.700 | 0.865 | 3.49 | 4 |
| 0.666 | 0.8004 | 0.881 | 4.58 | 3.7 |
| 0.7492 | 0.9006 | 0.8929 | 5.794 | 3.1 |
| 0.8324 | 1.001 | 0.9017 | 7.156 | 2.3 |
| 0.9157 | 1.101 | 0.9077 | 8.663 | 1.3 |
| 1 | 1.20 | 0.911 | 10.3 | DC |

SLAB INDUCTOR DEVICE PROVIDING EFFICIENT ON-CHIP SUPPLY VOLTAGE CONVERSION AND REGULATION

CROSS-REFERENCE TO A RELATED US PATENT APPLICATION

This patent application is a continuation application of copending U.S. patent application Ser. No. 13/595,016 filed Aug. 27, 2012, which is a continuation application of copending U.S. patent application Ser. No. 13/589,280 filed Aug. 20, 2012, the disclosures of both applications being incorporated by reference herein in their entireties.

TECHNICAL FIELD

The exemplary embodiments of this invention relate generally to power supplies and more specifically to switching-type power supplies such as switching-type voltage conversion circuits and regulator circuits that can be formed in an integrated circuit.

BACKGROUND

Power consumption is an important consideration for current and future server and other processor designs. A power delivery network has several stages, each ideally having the maximal possible power conversion efficiency from the external AC mains supply plug to a processor internal power grid back-end-of-line (BEOL) network. An important link in this power delivery network is the last stage from the external data processor package power connection pins to an internal BEOL power grid. The power grid may be considered as a power distribution network that is fabricated within the processor chip or component. A current trend is to increase processor power consumption while decreasing the supply voltage. This can result in a very large electrical current being required in the last critical stage of the power supply chain and can result in issues such as, for example, the generation of power supply noise and/or simply the inability to withstand the high required current in the connections. One approach to addressing these issues is to design a further voltage conversion chip(s) within the processor package, or to have a monolithic voltage conversion unit on the same processor chip, thereby allowing a higher input voltage to the chip and thereby reducing the supply current.

The Buck regulator is a step-down type of voltage conversion unit that can be used in integrated circuit (chip) applications.

SUMMARY

An aspect of the exemplary embodiments of this invention provides method to convert a source voltage having a first value to a load voltage having a second value that differs from the first value. The method comprises providing a voltage regulator circuit comprised of a plurality of transistor switches coupled to the source voltage and to a slab inductor having a length, a width and a thickness, the slab inductor being coupled between the plurality of switches and a load and that sources a load current during operation of the plurality of switches; and operating the voltage regulator circuit to provide the load voltage at the load current.

BRIEF DESCRIPTION OF THE SEVERAL VIEWS OF THE DRAWINGS

FIG. 4 is a chart that summarizes exemplary circuit simulation results of the circuit shown in FIG. 3 for a case where D+E=1 (inductor current returns to zero at each cycle) at a frequency of 200 MHz, when varying the duty cycle D at a constant load resistance.

DETAILED DESCRIPTION

Figure 1A:
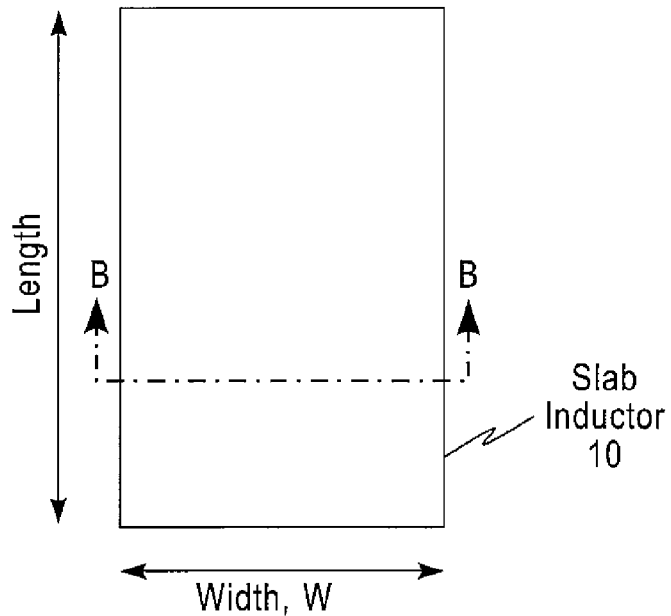
FIG. 1A is an enlarged top view of an open slab inductor in accordance with this invention.

As will be made apparent below the embodiments of this invention may be implemented as part of a Buck Regulator, or as part of any conversion/regulation design which contains inductors. The invention can also be implemented as part of a Boost regulator, which is a step-up type of voltage conversion unit. The invention can be implemented as part of an integrated circuit chip by including a slab inductor as described below.

In that conductors existing on the same chip may interfere with the proper operation of the slab inductor (often by the return current that they carry serving to reduce its inductance and its corresponding quality factor) the exemplary embodiments provide at least two solutions to this problem: (a) move any conductors near to or adjacent to the slab, such as by creating a window or aperture in a chip power grid that carries a return current and/or (b) adding ferromagnetic material (magnetic material in short) to magnetically shield the slab inductor from at least one conductor carrying a return current.

In a multi-core processor architecture, as well as other applications, the use of the embodiments of this invention enables the provisioning of independent and efficient voltage conversion and regulation to separate processor cores which, in turn, can beneficially reduce processor energy consumption, known in the art as DVFS (Dynamic Voltage and Frequency Scaling).

By way of background there are currently three main voltage conversion approaches on-chip: linear regulation, switched capacitor conversion, and inductor-based conversion/regulation. Linear regulation is basically equivalent to having a series resistance on-chip to reduce the voltage and is therefore non-efficient due at least to resistive losses. Switched capacitor circuits have low efficiency unless working in a predefined and fixed voltage conversion ratio and are thus most efficient only for specific and fixed voltage conversion ratios (e.g., a 2:1 ratio). Inductor based designs, such as Buck circuits (Buck regulators), allow for both voltage conversion and regulation on-chip by providing a continuous efficient output voltage range. However, conventional on-chip inductor based designs suffer from low power conversion efficiency (e.g., about 70%-75% at most) due at least in part to the low quality factor (Q) of existing on-chip inductor technology (e.g., Q<7).

The various exemplary embodiments of this invention enable on-chip >90% voltage conversion efficiency and regulation efficiency that is enabled at least in part by a novel on-chip open slab inductor device.

The exemplary embodiments of this invention provide a flat >90% efficient, fully on-chip regulator design, such as but not limited to a Buck regulator design, that can be used with, for example, a $V_{supply}$=1.35V, 0.7V<$V_{load}$<1.25V, $I_{load}$~100 A. The exemplary Buck regulator design uses what can be referred to as "open slab inductor" embodiments that are made possible by this invention.

The exemplary embodiments of this invention provide the use of what may be referred to as a partially or fully "air core" inductor, which can include an inductor coupled with and embedded within a low permeability medium and/or an inductor coupled with at least one layer of magnetic shielding (e.g., ferromagnetic) material disposed between the inductor and potential return current paths.

The exemplary embodiments of this invention provide for the use of a relatively wide and thick metal (e.g., copper) inductor slab cross sectional area to reduce resistive losses, increase electrical conductivity and thus allow for high Q factors (e.g., as much as 30 and greater).

The exemplary embodiments of this invention also provide for the use of magnetic material(s) only for magnetic shielding of the open slab inductor device from return current paths, such as those represented by an on-chip power grid and/or other nearby BEOL wires (conductors), as well as possibly package-related metallization and/or other metal objects in the vicinity of the chip.

Another exemplary embodiment of this invention reduces the detrimental effect of other nearby on-chip wires by locating them far away from the slab and creating an aperture in the power grid, as will be described below with reference to FIGS. 1D and 1E.

Some conventional approaches use magnetic core inductors in which there is no intentional air gap in the magnetic flux path, thereby requiring most of the magnetic energy to be stored within the magnetic material. While this may tend to increase the inductance, it also serves to decrease the quality factor (Q), where Q is the main figure of merit of the on-chip inductor and is directly related to the maximum obtainable power conversion efficiency. The quality factor obtained by these conventional approaches is reduced at least in part due to eddy current losses in the magnetic material in addition to other magnetic losses such as domain rotation. These eddy current losses tend to be high since most of the magnetic energy is stored within the magnetic material itself.

Contrary to these conventional approaches, the use of the open slab inductor device of this invention stores most of the magnetic energy in air (or in a dielectric medium) and relatively little energy in the magnetic material. This allows for a much higher electrical current density in the metal (e.g., copper) slab before reaching magnetic field saturation in the given magnetic material. Since the total required on-chip inductance is inversely proportional to the needed load electrical current, it is possible to obtain the required inductance for the given required high load current while optimizing the quality factor and the resulting power conversion efficiency. A high metal cross-sectional area in the slab is a desirable goal in order to achieve a high quality factor.

A primary purpose of the magnetic materials that are used in the context of this invention is to magnetically shield the Open Slab Inductor Device from other current carrying (e.g., metal) wires on-chip which would otherwise act as current return paths, thereby reducing the quality factor Q of the slab often by as much as an order of magnitude or more. Some most detrimental metal wires on chip (in this context) are the processor power grid wires. The magnetic shielding used as an aspect of this invention for the open slab inductor device also serve to cancel crosstalk between the open slab inductor device and the processor global clock distribution network (or other sensitive wires on-chip), which can be reduced by other engineering means for an embodiment where the magnetic layer does not exist, such as in the embodiments shown in FIGS. 1D and 1E.

In practice, the open slab inductor device includes a wide and thick metal (such as copper) BEOL wire in a high metal layer of the metal stack which forms the inductor of the voltage conversion/regulation circuit. Regulation can be performed from the (external to chip) supply of, e.g., 1.5 V (or lower) to a continuous range of output voltages (e.g., about 1.4 V down to about 0.6 V). Another embodiment option is a fixed ratio voltage conversion (2:1 and the like), or one circuit combining both conversion and regulation (either by the same Buck circuit or in two consecutive circuits performing fixed conversion first followed by regulation).

Some (typically most often preferred) embodiments include several phased open slab inductor devices which operate together in parallel as a circuit to supply the required load current. Some embodiments use one such multi-open slab inductor device circuit for each processor core separately, other embodiments use more than one multi-open slab inductor device circuits in parallel for each processor core separately. However, it is also within the scope of this invention to use one open slab inductor device circuit to supply power to two or more processor cores (or other circuitry).

The magnetic shielding can be achieved by at least two different approaches: One approach is to immerse the open slab inductor within a low permeability (e.g., about 10-15 or even less) and high resistivity magnetic material medium (as opposed to the conventional use of very high permeability materials of for example, about 1000 which are also highly conductive). A second approach is to use a high permeability magnetic material layer between the open slab inductor device and the power grid, which acts as a "perfect H" magnetic shielding layer. In order to further reduce the magnetic losses within this magnetic layer the layer can be laminated (FIG. 2C—wherein multiple magnetic shielding layers are separated by thin insulating layers) or patterned so as to have openings within it (FIG. 2B), or even more preferably both approaches can be used together. One example is to use a slotted layer characterized by narrow rectangular regions (although other geometric shapes could be used as well such as rectangles with different aspect ratios) which prevent eddy currents from forming within the magnetic layer (such eddy currents are the main contributors to the magnetic material loss), plus aiding to form an improved aspect ratio of the magnetic layer which yields a higher effective permeability. The lamination of the magnetic shielding is beneficial since it also improves the magnetic properties of the layer (e.g., it reduces an "edge curling effect" which tends to reduce the effective permeability of the magnetic layer).

Figure 2A:
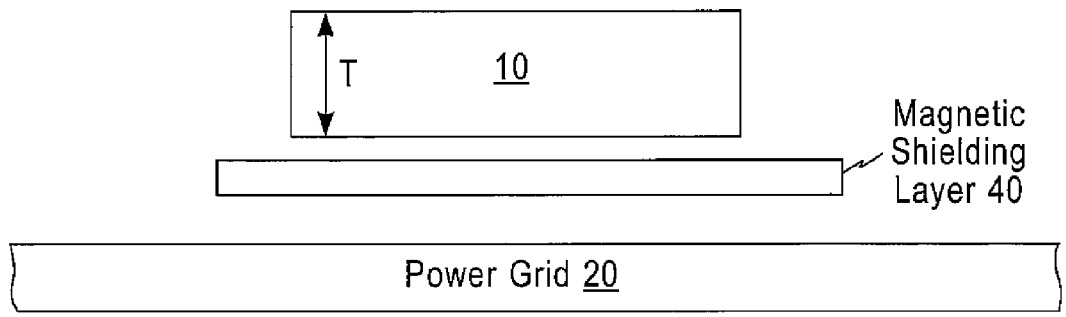
FIG. 2A illustrates an exemplary embodiment wherein a return current impact can be reduced or eliminated by disposing the open slab inductor over (or under—such in FIG. 2D) a magnetic shielding layer.
Figure 2B:
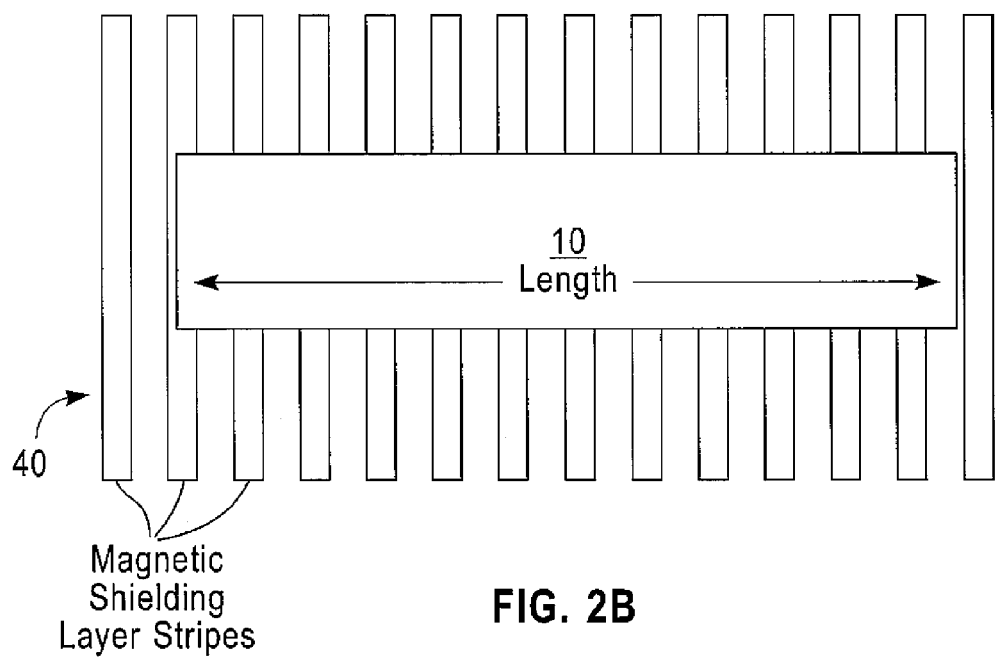
FIG. 2B shows an exemplary embodiment wherein the magnetic shielding layer is implemented as a pattern of stripes in a ferromagnetic layer between the open slab inductor and a power grid. These stripes can either be narrow and dense as shown, or can be another division of the magnetic layer into rectangles of much different aspect ratio.
Figure 2C:
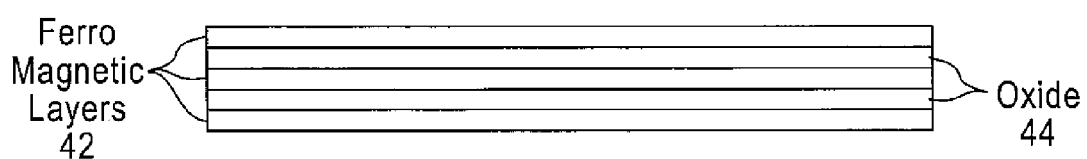
FIG. 2C shows an exemplary embodiment wherein the magnetic shielding layer 40 is implemented as a multi-layered laminated structure, with each layer separated from the next by a thin layer of oxide or some other electrically insulating material. A combination of both slotting (FIG. 2B) and lamination (FIG. 2C) can be one preferred embodiment of this invention.

Both of the embodiments of this invention shown in FIGS. 2B and 2C achieve the same purpose of providing magnetic shielding and also increasing the quality factor.

As was noted above, a further embodiment combines the slotted and laminated magnetic layer embodiments to provide a slotted and laminated magnetic shielding layer.

In another embodiment a second magnetic shielding layer can be provided over the top of the open slab inductor device, thereby forming a second magnetic shield between the open slab inductor and the top of the integrated circuit (IC) package. The top of the IC package may have a metal cover (which could support eddy currents and reduce the quality factor by both reducing the inductance and creating losses). The use of this embodiment can thus be contingent on the type of packaging that is used to house the processor cores and/or other circuitry of interest. Another benefit that can be realized by the use of the second top magnetic shielding layer is the avoidance of EMI (electro-magnetic interference) that may radiate from the top surface of the package due to operation of the open slab inductor device.

While the embodiments of this invention will be further described below in the context of a switching converter circuit embodied as a Buck converter (regulator) circuit that contains the open slab inductor device to provide voltage conversion and regulation, it should be appreciated that other inductor-based voltage conversion circuits, such as boost converters, can also be used.

The Buck converter circuit that uses the open slab inductor device can provide, in one non-limiting example, an on-chip supply regulation (dynamic voltage frequency scaling (DVFS)) of:

about 1.35 Volt (supply) to a range of about 0.7 to about 1.25 regulated Volts;

about a 90% power efficiency over the entire output voltage range (i.e., the efficiency is basically "flat" over the output voltage range); and >10 Amper/mm$^2$ current density or higher.

In contrast, conventional approaches based on a closed yoke design can provide only about a 75% peak efficiency at lower load currents, where the quality factor is severely limited by magnetic material conductance. Only relatively very low current densities are possible to avoid high μ magnetic material saturation. In these approaches larger wire widths are not beneficial since most of the losses are magnetic material losses.

The use of the embodiments of this invention avoids the high magnetic material losses (e.g., about 15% in the closed yoke approach) due mainly to eddy current losses that can limit the Q to non-optimum values (e.g., less than 10). Note that magnetic rotation and domain wall movement losses are also proportionally reduced when replacing a closed yoke with the open slab structure that is an aspect of this invention.

The exemplary embodiments of this invention are more correctly focused on current density as a figure of merit as opposed to inductance density as in various conventional approaches. The inductance density can be shown to be a misleading figure of merit as follows.

Unlike in switched capacitor circuits (a different approach for on-chip voltage conversion) in which the total required floating capacitance is proportional to the load current and power, in a Buck converter regulator the total required inductance is inversely proportional to the load current and power:

$L(\Delta I/\Delta t)=V_S-V_L \Rightarrow L*\Delta I=(V_S-V_L)*\Delta t$=constant, where $V_S$ is the buck regulator source voltage and $V_L$ is the load voltage.

More precisely, for an exemplary case where $V_S$=1.35V and 0.7V<VL<1.25V, for a condition where D+E=1 (inductor current waveform which reduces to zero once in a cycle) at $V_{Lmin}$=0.7V (the minimal output voltage corresponding to the maximal required inductance value) one obtains (at $V_{Lmin}$:

$$L_{min}=1/2*R_L*(V_S-V_L)/V_S*T,$$

where D is the duty cycle (fraction of the cycle when inductor current is increasing) and E is the fraction of the cycle when inductor current is decreasing, so that D+E=1 denotes a condition wherein the inductor current is always changing while reaching zero once in a cycle (either increasing or decreasing, see the example of FIG. 3), $R_L=V_L/I_L$, T=1/f
and where $$L*I_L=V_{Lmin}/V_S[(V_S-V_{Lmin})/2f].$$

As an example, $L*I_L$=8.42 pH (picoHenry)*100 (Amps) at 200 MHz.

For the case of D+E=0.5 (where the inductor current is forced to zero during half of the cycle) one obtains $L*I_L$=4.2 pH*100 (Amps) at 100 MHz.

Thus, one needs a very small total inductance at large currents which means that fewer smaller inductor can be used to carry the same total large load current. The embodiments of this invention employ the usage of a small number of the smaller open slab inductors to carry the same large load current for which many closed yoke higher inductors are required.

Since the open slab inductor structure enables much higher Q factors (e.g., 20 . . . 30) the high magnetic coupling approach used in the closed yoke structures is not required to separate between the DC and AC inductor currents. One non-limiting example of a preferred embodiment of this invention therefore employs only weakly magnetically coupled open slabs forming a multi-phase Buck converter design.

Figure 1B:
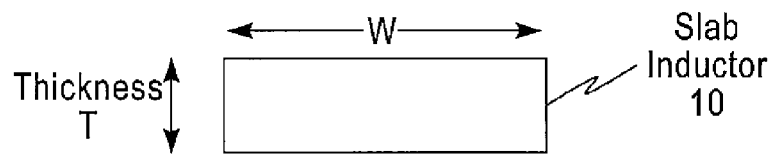
FIG. 1B, taken across the section line B-B of FIG. 1A, is an enlarged cross-sectional view of the open slab inductor. The slab inductor shown in FIGS. 1A and 1B, and other Figures, is not drawn to scale.

FIG. 1A is an enlarged top view of an open slab inductor 10 in accordance with this invention while FIG. 1B, taken across the section line B-B of FIG. 1A, is an enlarged cross-sectional view of the open slab inductor 10. The open slab inductor 10 is characterized by having a length, a width (W) and a thickness (T). The open slab inductor 10 can be formed of a single monolithic body of an electrical conductor such as one containing a metal, such as copper, or metals, or it can be formed as a multi-layered body of a metal or metals, such as two or more layers of copper formed one above the other. The open slab inductor 10 may be characterized without limitation as being an inductance (open environment) air core device designed with a supporting structure or structures so as to reduce or eliminate a return current impact from adjacent conductors, such as the on-chip power grid 20 shown in FIG. 1C.

As an example, for inductor dimensions of w=200 µm, t=7 µm, length=400 µm, in copper, one obtains (in open environment, namely as a partial inductance):

L~138.8 pH, R=5 mΩ, and

Q=35 (at 200 MHz)=>L/R=28 nsec, that is realizable by the air core slab inductor 10.

It should be noted that due to the high cross section area of the open slab inductor 10, the electro migration (EM) limit is ~15 Amper per slab (in copper as an example).

Note that the relatively small area required (>10 A/mm$^2$) can occupy dedicated top metals of the chip only. In addition, control parameters can be designed to minimize the impact of the return current, crosstalk to clock/wires and EMI.

The inductance of an open slab inductor 10 such as depicted by FIGS. 1A and 1B may be significantly reduced in an actual implementation of a chip environment due to adjacent wires on-chip carrying a return current thereby forming a smaller inductance loop. The presence of a return current reduces both the inductance and the Q factor, and has the potential to significantly degrade the usefulness of the slab inductor 10. This invention therefore provides at least two different solutions to this problem. A first solution involves moving or re-locating these return current carrying wires (conductors) as far as is practically possible from the open slab inductor 10. The second solution employs magnetic shielding between the open slab inductor 10 and these return current carrying wires (conductors).

Figure 1C:
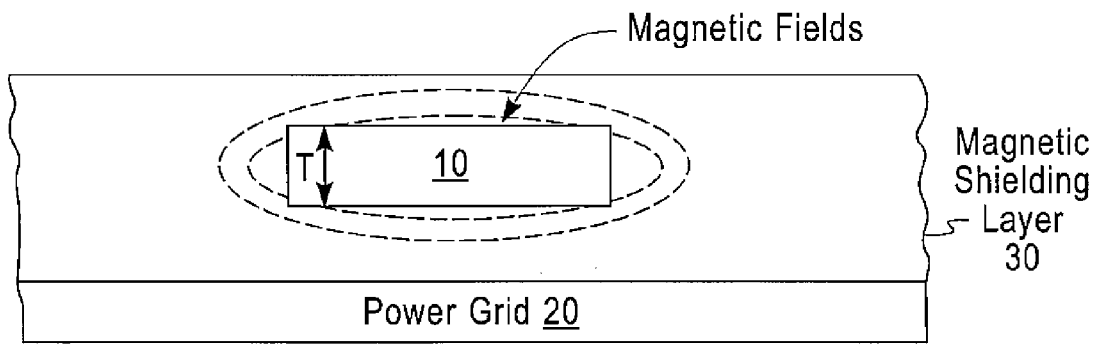
FIG. 1C shows that a return current impact caused by the power grid of the same chip which can be reduced or eliminated by embedding the open slab inductor in a magnetic shielding layer. Note that the power grid is a most common example of an interfering conductor which may impact the open slab inductor unless properly located or shielded, but is not the only case covered by this invention, for example the magnetic shielding layer can protect the slab inductor from another wire running close to or adjacent to the slab inductor.
Figure 1D:
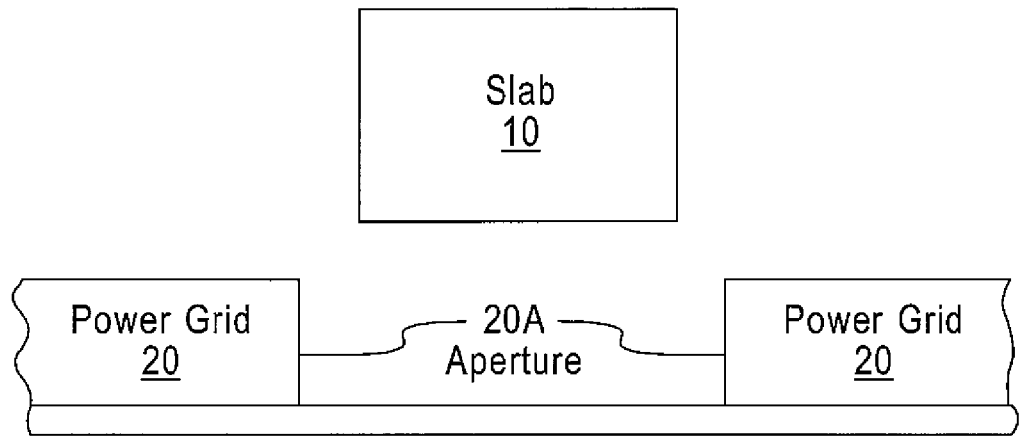
FIG. 1D shows in cross-section an embodiment where the power grid has at least one opening or window or aperture that is designed to lie beneath the location of the slab inductor thereby eliminating or at least reducing coupling between the slab inductor and the power grid.
Figure 1E:
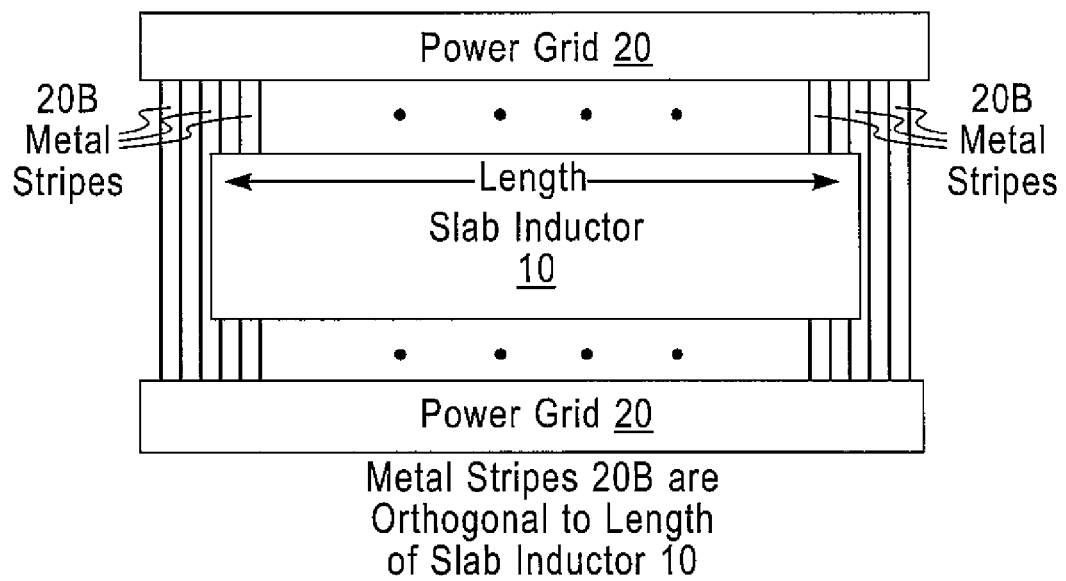
FIG. 1E shows an alternative embodiment of the embodiment shown in FIG. 1D where metal stripes (metal conductors), which are a part of the power grid, are located orthogonal to the length of the slab inductor. Those stripes that would run collinear with the length of the slab inductor are removed (e.g., not fabricated by design). The stripes serve to shield the slab inductor from the silicon substrate and also serve to preserve the integrity of the power grid by maintaining equal potential across the power grid as required.

The first approach of moving the disturbing (e.g., return current carrying) wires away from the slab inductor 10 is exemplified in FIGS. 1D and 1E. These Figures demonstrate the treatment of what may be considered as the major set of potentially return current carrying wires detrimental to the open slab inductor 10 functionality, e.g., the power grid of the same chip. FIG. 1D shows an embodiment by which an aperture 20A is opened in the chip power grid 20 which eliminates the flow of return current right below or close to the open slab inductor 10 within the power grid 20. FIG. 1E shows a modified embodiment in which at least some power grid wires 20B are left below and in the vicinity of the open slab inductor 10, being those which are orthogonal to the length of the open slab inductor 10 itself, and therefore those conductors that cannot conduct a collinear return current to the excitation open slab inductor current. These orthogonal conductors or stripes 20B may be required or at least desirable in some embodiments and instantiations of the power grid design in order to maintain the integrity of the power grid 20 as a low impedance, fixed potential electrically conducting plane.

The embodiments of this invention also encompass forming magnetic shielding between the open slab inductor 10 and the other wires potentially carrying the detrimental return current, as illustrated by means of the non-limiting examples in FIG. 1C, FIG. 2A, FIG. 2B, FIG. 2C, FIG. 2D and FIG. 2E.

These two solutions are not mutually exclusive, and both can be used in some form in the same integrated circuit package.

In one exemplary embodiment of the second solution shown in FIG. 1C the return current impact can be reduced or eliminated by embedding the open slab inductor 10 in a magnetic shielding layer 30, such as a layer 30 comprised of a low conductivity material such as Polyimide Ferrite which has a magnetic relative permeability significantly larger than one. In this case the magnetic fields emanating from the open slab inductor 10 are confined to the Polyimide Ferrite medium, and the magnetic shielding layer 30 thus avoids the power grid destructive effect on the inductance of the open slab inductor 10. This resulting increase in inductance that is realized by mitigating the return current losses serves to increase the Q, increase the efficiency and reduce the area that is needed to implement the inductor.

Referring to the cross-sectional view shown in FIG. 2A, in another exemplary embodiment of the magnetic shielding solution of this invention the return current impact can be reduced or eliminated by disposing the open slab inductor 10 over (above the power grid 20) a magnetic shielding layer 40 that is preferably electrically floating (or at most tied at but one point to circuit ground). The magnetic shielding layer 40 is placed between the open slab inductor 10 and the underlying power grid 20. The magnetic shielding layer 40 can be formed as one or more substantially continuous layers or, more preferably, it can be formed as one or more non-continuous layers (e.g., patterned or apertured layers). Here again, the power grid 20 is presented by example as a most common example of an interfering conductor which may impact the open slab inductor 10 unless properly located or shielded, but is not the only case covered by this invention. For example the magnetic shielding layer 40 can protect the slab inductor 10 from another wire running very close to the slab inductor 10.

Referring to the top view of FIG. 2B it can be seen that in one exemplary embodiment the magnetic shielding layer 40 can be implemented as a pattern of stripes made in a ferromagnetic layer between the open slab inductor 10 and the power grid 20. These stripes can either be dense and close packed as shown (whereby minimizing eddy current losses in 40) or they can resemble wider rectangles or squares or some other pattern (thereby avoiding magnetic edge effect losses in the magnetic shielding layer 40).

In some embodiments, and as is shown in the cross-sectional view of FIG. 2C, it can be preferred to implement the magnetic shielding layer 40 as a multi-layered laminated structure, with each thin ferromagnetic layer 42 separated from the next by a thin layer 44 of oxide or some other electrically insulating material for reducing the eddy current losses, or even by conductive thin layers (such as copper) which still aid in reducing or cancelling the magnetic edge curling effect.

One suitable but non-limiting material for implementing the magnetic shielding layer 40 is to use a film or films of amorphous CoZrTa. Other suitable materials can include NiFe with different composition ratios, or other compound ferromagnetic materials preferably with high magnetic permeability and with high electrical resistivity.

In general, the magnetic shielding layer 40 can be characterized as configured by being formed as a plurality of layers, where in one embodiment such as in FIG. 2B the plurality of layers are disposed in a same horizontal plane located between a plane defined by the length and width of the slab inductor 10 and the power grid 20, and where in another embodiment individual ones of the plurality of layers are disposed one above another in a laminated manner as in FIG. 2C between the plane defined by the length and width of the slab inductor 10 and the power grid 20. In a still further embodiment some of the plurality of layers are disposed in the same horizontal plane located between the plane defined by the length and width of the slab inductor 10 and the power grid 20, and some of the plurality of layers are disposed one above another in a laminated manner between the plane defined by the length and width of the slab inductor 10 and the power grid 20.

The use of the "air gap" in the magnetic flux of the open slab inductor 10 increases the current density versus some conventional closed magnetic yoke approaches, and results in a much higher current density before magnetic saturation occurs.

Figure 2D:
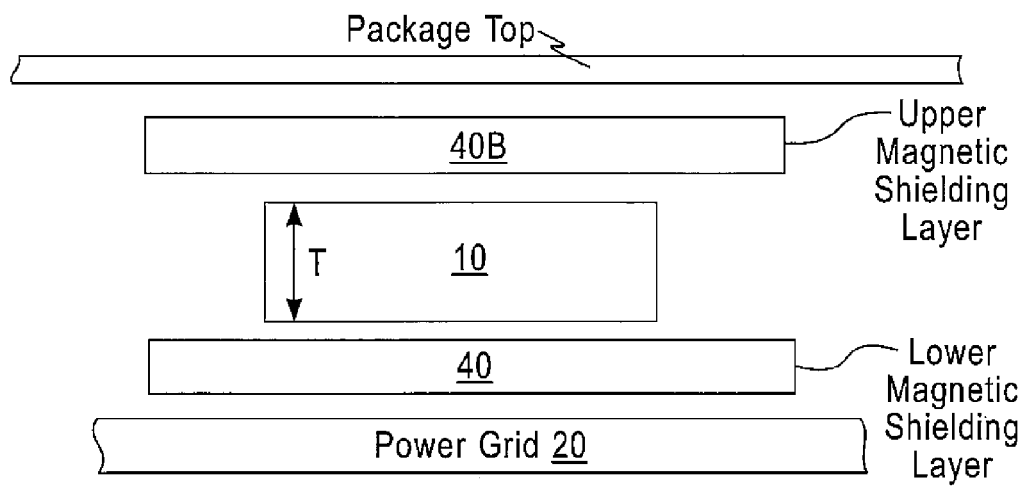
FIG. 2D shows an embodiment where a separate continuous layer or patterned layer and/or laminated magnetic shielding layer can disposed on an opposite side of the open slab inductor in order to mitigate any return current issues resulting from any metallization in the chip above the slab or in the chip package or external to the chip package, as well as to reduce or eliminate potential EMI caused by radiation emitted from the slab inductor.

Further, and referring to FIG. 2D, it is pointed out that a separate continuous layer or patterned layer and/or laminated magnetic shielding layer 40B can disposed on the opposite side (opposite to the power grid 20) of the open slab inductor 10 in order to mitigate any return current losses resulting from any metallization in the top of the chip package and/or external to the chip package and/or to other in-chip wiring that may lie above the slab inductor 10, as well as to reduce or eliminate package-generated EMI.

It should be noted that the specific geometry, number of layers, etc., of the magnetic shielding layer 40 can be designed to differ from the specific geometry, number of layers, etc., of the upper magnetic shielding layer 40B. That is, they can be separately designed and optimized for their intended purposes.

Figure 2E:
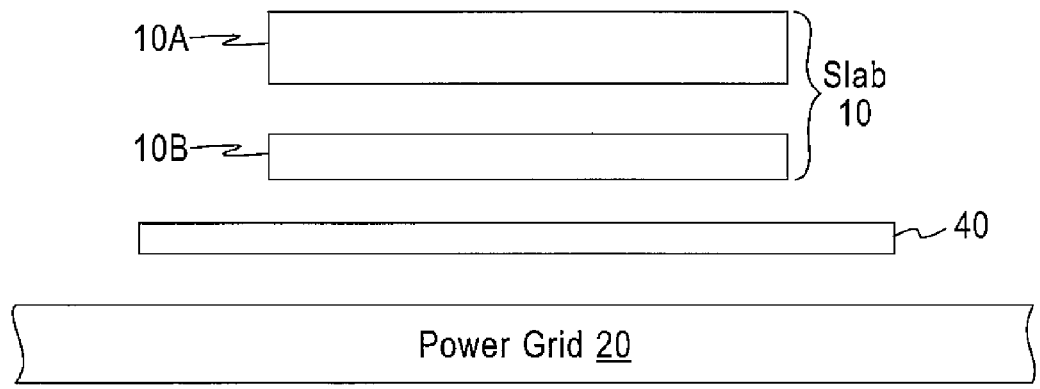
FIG. 2E shows an embodiment where the slab inductor is comprised of two or more electrically connected sub-slabs. This embodiment may be preferred due to current limitations related to fabrication of a thick copper conductor.

As a non-limiting example of an embodiment of this invention, and referring to FIG. 2E, the open slab inductor 10 could be formed as a 200 μm wide slab in two copper layers (slabs) 10A, and 10B, each having a thickness of about 3 μm (total thickness T being about 6 μm), and the magnetic shielding layer 40 can be a 2 μm thick layer with a permeability (mu) =1000, and assuming as an example zero conductivity of the magnetic material. The power grid 20 could be located for example about 2.5 μm below the lower-most slab of the open slab inductor 10. For this non-limiting example one can obtain a Q of about 29.5 at 200 MHz (assuming as a non-limiting example L=360 pH with a slab length of 500 μm). It can be shown that without the presence of the magnetic shielding layer 40 the Q would be reduced to only about 1.6.

When considering the foregoing example, but with magnetic shielding losses (e.g., a finite 100 μΩ-cm resistivity of the magnetic material) included and mu=1000 the value of Q is about 20.5 at 200 MHz. Note that the value of Q can be increased considerably when the patterned (e.g., striped) magnetic shielding layer 40 is used, and Q can be increased as well when the magnetic shielding layer is also laminated, which can by design be made practically almost to the point of the original case with no magnetic layer losses (e.g., Q~30).

It should also be noted that beyond the exemplary embodiments of the two main fundamental solutions (moving away the disturbing wires or magnetically shielding them) as shown in FIGS. 1C, 1D, 1E, 2A, 2B, 2C, 2D and 2E, the examples of the embodiments of this invention include any combination of the solutions described above. As a non-limiting example, one may form both an aperture 20A in the power grid 20 and use a magnetic shielding layer (30 or 40) in the same embodiment, thereby gaining the benefits of both approaches.

Figure 3:
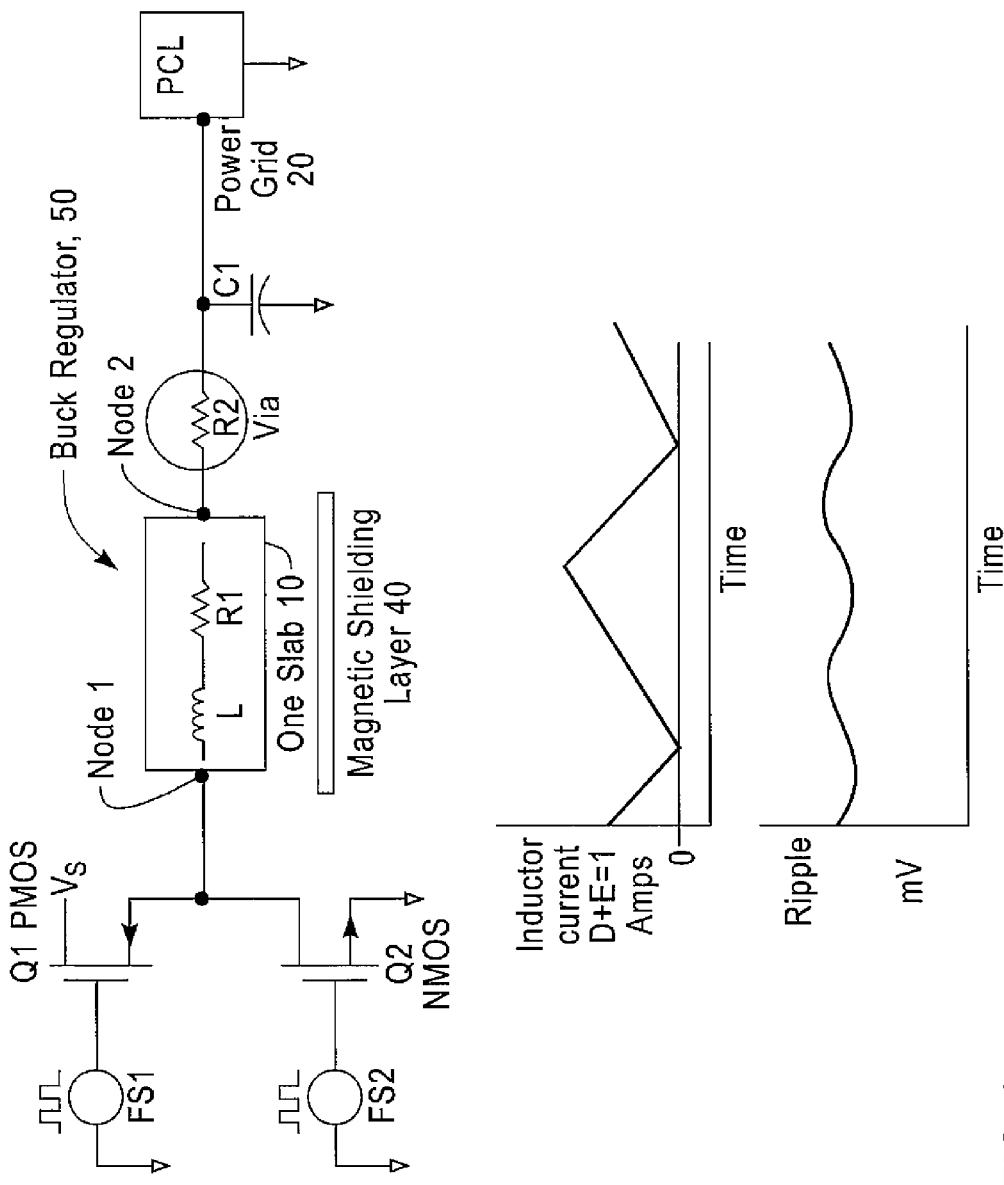
FIG. 3 depicts an exemplary Buck regulator circuit that can be utilized to implement the exemplary embodiments of this invention. One or more phases of such circuits with corresponding slab inductors operating in parallel for driving current to the same load may be implemented.

During use of the exemplary embodiments of this invention, and for on-chip voltage supply regulation, several basic Buck regulator circuits of a type shown in FIG. 3 can be used, each operating phased together and coupled together with the same D+E value. An overall system Q of at least 20 may be required (e.g., at 100 MHZ-200 MHz) for obtaining the desired high power efficiency, and several phases can be used in tandem to drive an exemplary value of 30 A per processor core output current. The series resistance losses in the combination of the transistors, vias and wires are assumed to be reasonably designed so as to be preferably, but not limited to, no more than half the losses in the slab inductors 10. It is also assumed that a reasonable core decoupling capacitance is provided that is sufficient for obtaining an exemplary value of about 15 mV ripple at 100 MHz, a >10 Amper/mm$^2$ overall current density occupying primarily or exclusively dedicated top metal layers of a chip, and a minimum 90% efficiency at (worst case) a 0.7 Volt output. All of these values are given as one non limiting example only, and the same open slab inductor concepts can be used in a large variety of inductor-based on-chip voltage converters/regulators which are not limited to Buck converters and may as well include boost converters, buck-boost converters and the like, as known to a person skilled in the art.

FIG. 3 is a basic simplified circuit diagram of a non-limiting example of a single slab Buck regulator 50 that could be used to simulate the performance outlined above. The Buck regulator 50 includes at least two transistors Q1 (PMOS) and Q2 (NMOS) driven by phased frequency sources FS1 and FS2, respectively (in practice each of these transistors is often implemented by a large number of transistors connected in parallel and/or multi fingered transistors as required for providing the needed load current). The transistors Q1 and Q2 are connected at Node 1 and coupled to a first terminal T1 of the slab inductor 10. In this very specific and non-limiting simulated example, the slab inductor 10 is assumed to have an inductance of about 80.5 pH and an inherent resistance R1 of about 3.5 mΩ. A second terminal (T2) of the slab inductor 10 is coupled though a via or vias (having an inherent resistance R2) and distribution wires to a decoupling capacitor C1 having a capacitance of about 1.8 pF in this specific example. The second terminal T2 is also coupled to a normalized processor core load (PCL) which is represented here as a simple resistor of 140Ω, though in practice one can consider the super-linear current voltage dependence of this type of a load. The overall wiring losses are assumed in this specific example to be equal to the actual transistor losses (series channel conductance and $CV^2f$ losses). The simulation was performed with D+E=1 at 100 MHz/200 MHz, as well as with D+E=0.5. The circuit was scaled 1:1000, where 1 mA represents 1 A. No slab-to-slab coupling was assumed, and the ripple was estimated by dividing a single phase result by the number of phases (accommodating ripple cancellation effects). Note that in practice this rather crude approximation would later be corrected to account for the actual combined ripple. A 5 A load current was simulated in all cases at the 0.7 Volt output (average current per slab), a 1.3 Volt input, and 0.7 Volt to 1.2 Volt output range. The simulated decoupling capacitance was equivalent to about 0.5 μF at 26 A, assuming 16 phases scaled to the simulated 5 A current at 0.7 Volt (worst case estimation). Also assumed was a 20 mV drop at peak inductor current on the transistors Q1 and Q2, and the same drop was assumed for vias/wires. The calculated slab inductor value and loss for 90% efficiency were assumed.

In practice two or more of the Buck regulator circuits 50 can be provided, e.g., four or eight or sixteen, with their operations being phased and their outputs connected in parallel to supply a single load, e.g., a single processor core, or two or more or loads, e.g., two or more processor cores and/or other types of circuitry.

FIG. 4 is a chart that summarizes the simulation results for D+E=1 at 200 MHz, full output range operation, and a mode where the duty cycle D was varied at a constant period T and $R_L$. It can be noted that the efficiency exhibited is basically flat over the full output voltage range of 0.7V to 1.2V and over the output power range of 3.49 W to 10.3 W, which is one beneficial result of the use the exemplary embodiments of this invention.

In the exemplary embodiments of this invention the magnetic shielding layer 40 can be fabricated by any suitable conventional metal deposition process including, as non-limiting examples, sputtering, electroplating and electro-less plating.

As for the open slab 10 itself, depending on the specifics of the process used and the desired thickness (T), two or more depositions may be used, such as two 3 μm thick Cu layers that are deposited sequentially one upon another with an intervening layer of some material (e.g., an oxide) as in the embodiment of FIG. 2E. The open slab metal is preferably copper implemented by a damascene process, though gold, silver and aluminum layers may also be used alone or in combination. The layers 10A, 10B are electrically connected together such as by using one or more vias. In one non-limiting embodiment the two Cu layers 10A, 10B are electrically connected together at or near their ends (length-wise), although they may be connected also at a point or points between these two end points along the open slab.

In general the total thickness (T) of the slab inductor 10 may be in an exemplary range of about 3 μm to about 15 μm, with about 5 μm to about 10 μm being a more preferred range of thickness for many applications of interest. The width (W) of the slab inductor 10 may be in an exemplary range of about 50 μm to about 300 μm, with about 150 μm to about 250 μm being a more preferred range of width for many applications of interest. It is appreciated that the cross-sectional area (T*W) is directly related to the current carrying capacity of the open slab inductor 10 and thus also to the realizable value of Q and is determined accordingly. The length is selected based primarily on the desired value of inductance. As a non-limiting example, the length (L) might be in an exemplary range of about 1 mm to about 5 mm, with about possibly 1.5 mm to about 3 mm being a more preferred range of length for many applications of interest.

As was noted above, the embodiments of this invention are not limited for use in only Buck regulator circuit topologies, as other types of switched convertors/regulators (e.g., Boost regulators) can also benefit from the use of the teachings of this invention. In general any voltage converter/regulator containing at least one inductor implemented on a semiconductor chip, such as a chip containing one or more processor cores, may benefit from this invention.

Further, it should be appreciated that the embodiments of this invention are not limited for use only with providing power to data processor chips and/or only to cores of multi-core processor chips. For example, the embodiments of this invention could be used to provide (possibly varying) operating power to integrated circuit chips containing graphics accelerator circuitry, or cryptographic circuitry, or communications circuitry (e.g., wired or wireless communications circuitry), or to combinations of these alone or with other types of circuitry and/or in combination with single-core or multi-core data processor circuitry. In various embodiments, and by example, at least one Buck regulator 50 could supply power to a block of circuitry providing cryptographic functionality, while at least one other Buck regulator circuit 50 could supply power to at least one core of a single core or a multi-core data processor integrated in the same chip with the block of circuitry providing cryptographic functionality. In such an exemplary arrangement, and by example, at least one Buck regulator circuit 50 providing power to the block of circuitry that provides the cryptographic functionality may be operated to provide a minimum voltage to the block of circuitry providing cryptographic functionality when this functionality is not actively being used, while at least one different Buck regulator circuit 50 that is arranged to provide power to the at least one processor core may be operated to provide a maximum voltage to the processor core circuitry when this functionality is most actively being used, Further, and as was noted above, it is within the scope of the exemplary embodiments of this invention to employ a power grid 20 that is designed so as to eliminate or at least reduce an amount of power grid metallization beneath and closely adjacent to the slab inductor 10. For example, and as was previously described, FIG. 1D shows in cross-section the embodiment where the power grid 20 has at least one opening or aperture 20A that is designed to lie beneath the location of the slab inductor 10, thereby eliminating or at least reducing the magnetic coupling between the slab inductor 10 and the power grid 20 and thereby also beneficially reducing the generation of eddy currents and the negative effects of the return current on the Q of the slab inductor 10.

As was described above, the embodiment of FIG. 1D illustrates the concept of having some or all potentially interfering conductors on the chip located sufficiently far away from the slab inductor 10 so that the usage of the magnetic shielding 40 by a dedicated magnetic material may no longer be required. Since in practice one may not always have the option of having the aperture window 20A in the power grid 20, the embodiments of this invention also contemplate the use of the magnetic shielding layer 40 for shielding the slab inductor 10.

As was also described, FIG. 1E shows a variation of FIG. 1D in which the metal stripes 20B, which form a part of the power grid 20, are located orthogonally to the slab inductor 10 (orthogonal to the length axis of the slab inductor 10). In this embodiment the aperture 20A is made only in those wires of the power grid 20 which are collinear with the length axis of the slab inductor 10, and which are therefore removed from the power grid 20, leaving present only those wires (20B) of the power grid 20 which are orthogonal to the slab inductor 10 (or at least part of them). The embodiment of FIG. 1E may for some applications be considered a preferred embodiment of this invention.

While the slab inductor has been described above in reference to a single or multi-layered structure comprised of copper, and as was noted above, in other embodiments other metals that exhibit high electrical conductivity can be used such as gold or other metals or combinations of metals or metal-containing materials, subject to the practicalities of selected (e.g., integrated circuit) fabrication processes.

Note again that the embodiments of FIGS. 1D and 1E can be used with any of the foregoing embodiments. That is, the slab inductor 10 could also employ any of the return current mitigation (and Q enhancing) approaches shown in FIGS. 1C and 2A through 2E.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

The invention claimed is:

1. A method to convert a source voltage having a first value to a load voltage having a second value that differs from the first value, comprising:
providing a voltage regulator circuit comprised of a plurality of transistor switches coupled to the source voltage and to a slab inductor having a length, a width and a thickness, the slab inductor being coupled between the plurality of switches and a load and sourcing a load current during operation of the plurality of switches; and
operating the voltage regulator circuit to provide the load voltage at the load current.

2. The method as in claim 1, where the voltage regulator circuit is a buck regulator operated in a D+E=1 mode with a quality factor Q that exceeds 20 and with an efficiency that is substantially flat over a range of output load voltages.

3. The method as in claim 2, where the efficiency is in a range of greater than about 85% and less than about 100%.

4. The method as in claim 1, further comprising shielding the slab inductor from a return current with a magnetic shield configured so as to inhibit generation of eddy currents induced by current flowing in the slab inductor by forming a magnetic shield as a plurality of layers, where individual ones of the plurality of layers are disposed one above another in a laminated manner between a plane defined by the length and width of the slab inductor and conductors of a power grid.

5. The method as in claim 1, further comprising shielding the slab inductor from a return current with a magnetic shield configured so as to inhibit generation of eddy currents induced by current flowing in the slab inductor by forming the magnetic shield as a plurality of layers, where some of the plurality of layers are disposed in a same horizontal plane located between a plane defined by the length and width of the slab inductor and a power grid, and where some of the plurality of layers are disposed one above another in a laminated manner between the plane defined by the length and width of the slab inductor and the power grid.

6. The method as in claim 1, further comprising shielding the slab inductor from a return current with a magnetic shield configured so as to inhibit generation of eddy currents induced by current flowing in the slab inductor by forming the slab inductor to be coupled to the load through a power grid that comprises at least one conductor, and where the magnetic shield is configured by providing a first layer of ferromagnetic material disposed between a first lower surface of the slab inductor and the power grid and a second layer of ferromagnetic material disposed above a second upper surface of the slab inductor.

7. The method as in claim 1, where the slab inductor is comprised of at least one layer comprised of a metal that has a total thickness in a range of about 3 µm to about 15 µm, a width in a range of about 50 µm to about 300 µm, and a length selected a function of a desired value of inductance.

8. The method of claim 7, where the metal is comprised of copper.

9. The method as in claim 1, performed within an integrated circuit, where the load is comprised of at least one core of a multi-core data processor.

10. The method of claim 1, where the slab inductor is embedded within a layer of ferromagnetic material.

11. The method of claim 1, where a magnetic shield between the slab inductor and a conductor is configured by being formed as a plurality of layers, where the plurality of layers are disposed in a same horizontal plane located between a plane defined by the length and width of the slab inductor and a power grid.

12. The method of claim 1, further comprising shielding the slab inductor from a return current with a magnetic shield configured so as to inhibit generation of eddy currents induced by current flowing in the slab inductor by providing a laminated magnetic shield manner between a plane defined by the length and width of the slab inductor and a power grid, where in the magnetic shield at least some of the plurality of layers are disposed in a same horizontal plane located between a plane defined by the length and width of the slab inductor and the power grid, and where in the magnetic shield at least some of the plurality of layers are disposed in a same horizontal plane located between a plane defined by the length and width of the slab inductor and the power grid.

13. The method of claim 1, further comprising shielding the slab inductor from a return current with a magnetic shield configured so as to inhibit generation of eddy currents induced by current flowing in the slab inductor, where the magnetic shield is comprised of a first layer of ferromagnetic material disposed between a first lower surface of the slab inductor and the power grid, and is further comprised of a second layer of ferromagnetic material disposed above a second upper surface of the slab inductor.

14. The method as in claim 1, where the slab inductor is comprised of at least one layer comprised of copper and has a total thickness in a range of about 3 µm to about 15 µm, a width in a range of about 50 µm to about 300 µm, and a length selected a function of a desired value of inductance, where the voltage conversion circuit is fabricated as part of an integrated circuit, where the load is comprised of at least one core of a multi-core data processor.

15. The method as in claim 1, further comprising providing a plurality of the voltage regulator circuits each having a respective output connected in parallel to the load.

16. The method as in claim 1, where the voltage regulator circuit is a buck regulator circuit and where the load comprises at least one processor core disposed within an integrated circuit.

* * * * *